United States Patent [19]

Severn et al.

[11] Patent Number: 5,513,493
[45] Date of Patent: May 7, 1996

[54] FUEL CONTROL SYSTEM

[75] Inventors: Michael J. Severn; Roy L. Taylor, both of Bristol, England

[73] Assignee: Rolls-Royce plc, London, England

[21] Appl. No.: 887,373

[22] Filed: Jul. 11, 1986

[30] Foreign Application Priority Data

Jul. 12, 1985 [GB] United Kingdom ............... 8517744

[51] Int. Cl.⁶ ...................................................... F02C 9/28
[52] U.S. Cl. ........................................................ 60/39.281
[58] Field of Search ................................ 60/240, 39.27, 60/39.28 R, 223, 39.281

[56] References Cited

U.S. PATENT DOCUMENTS

| | | |
|---|---|---|
| 3,121,456 | 2/1964 | McCathron et al. . |
| 4,248,040 | 2/1981 | Kast ........................................ 60/39.27 |
| 4,337,616 | 7/1982 | Downing . |
| 5,083,277 | 1/1992 | Shutler ................................. 60/39.281 |
| 5,345,386 | 9/1994 | Mullen et al. ....................... 60/39.281 |

FOREIGN PATENT DOCUMENTS 1495274  12/1977  United Kingdom .

Primary Examiner—Charles T. Jordan
Assistant Examiner—Theresa M. Wesson
Attorney, Agent, or Firm—Oliff & Berridge

[57] ABSTRACT

Fuel for the combustion equipment of the engine of a vertical take off aircraft is supplied via pumps 50,24 through a metering valve 22, which is under the control of a digital electronic control unit (DECU) 10. A pressure drop regulator 30 and spill valve 32 ensure there is a constant pressure drop across the metering valve 22. To provide a rapid reduction in fuel output when the aircraft pilot slams shut his control lever 16 when he touches down after a vertical landing, and therefore prevent the aircraft from bouncing, the DECU 10 detects the sudden slamming closed of the lever 16, and opens a solenoid valve 60. Fuel now bleeds along line 58, and the input 54 of the regulator 30 sees an increased pressure drop determined by a potentiometer formed by two flow restricting orifices 56,62. The regulator 30 therefore opens the spill valve 32 giving the desired rapid reduction in fuel flow through the metering valve 22.

7 Claims, 2 Drawing Sheets 5,513,493

FUEL CONTROL SYSTEM

BACKGROUND OF THE INVENTION

This invention relates to fuel control systems for gas turbine engines. One example of its use is in engines for aircraft capable of landing vertically.

The British Aerospace P.L.C. Harrier and the McAir AV8A and AV8B aircraft are powered by a Rolls-Royce PLC Pegasus engine which employs vectorable hot and cold propulsive thrust nozzles. When landing vertically the nozzles are pointed downwards and the fuel flow is adjusted to control the upward thrust. By adjusting the upward thrust, vertical speed of the aircraft can be changed and the aircraft can be landed in a controlled manner. At the instant that the undercarriage wheels contact a firm base, some of the weight of the aircraft is transferred to the wheels and consequently the upward thrust momentarily exceeds the weight of the aircraft. Unless this thrust is diminished rapidly the aircraft is prone to "jump" upwards causing problems, for example, on wet decks. During descent, pilots are trained to detect "touch-down" and slam the throttles shut immediately. If the pilot or the fuel control system responds too slowly, the aircraft may bounce.

One current form of fuel control system employs a digital electronic control unit (DECU) which monitors various engine parameters (such as pressures, temperatures, speeds of rotation of spools etc.) and is responsive to movements of the pilot's throttle lever, to operate a motor driven metering valve which controls the flow of fuel to the engine. However, the response of such a fuel control system when a pilot slams the throttles shut on touch down can sometimes be slow, because of factors such as the ramp time taken by the motor which drives the metering valve to produce a corresponding decrease in fuel flow.

There are also other situations in which a rapid reduction in fuel flow may be required. For example immediately after an engine surge has been detected, a sudden decrease of fuel can enable the surge to be controlled.

SUMMARY OF THE INVENTION

According to the present invention, there is provided a fuel control system for regulating the flow of fuel to combustion equipment of a gas turbine engine, the system comprising:

fuel flow metering means, an inlet of which (in operation) is connected to a source of pressurized fuel and an outlet of which (in operation) is connected to the combustion equipment; and pressure regulator means having respective inputs connected to the inlet and the outlet of the flow metering means, and means sensitive to the pressure drop between said inputs and operable to regulate said pressure drop;

characterized by means connected to a first said input of the pressure regulator means and operable to increase the effective pressure drop sensed thereby, whereby the pressure regulator means acts to cause a reduction in fuel flow through the flow metering means.

In the application of the fuel control system to an aircraft gas turbine engine, the flow metering means may be acted upon by a control member operable by the aircraft pilot, and preferably there is an electronic control system connected to control the flow metering means in accordance with the position of the control member and in accordance also with other engine parameters.

Preferably, the electronic control system includes means for detecting the rate of movement of the control member, and for acting to operate the means connected to said first input when the rate of movement exceeds a value corresponding to a predetermined rate of reduction of fuel flow.

Preferably, said first input is connected to the outlet of the flow metering means via a flow restrictor, and the means connected to said first input acts (when operated) to bleed fuel away from said input along a bleed line to a source of lower pressure, thereby causing a pressure drop across the flow restrictor which is then sensed by the pressure regulator means. Preferably, there is a second flow restrictor in the bleed line, whereby the two flow restrictors act as a pressure potentiometer on said input. Preferably, there is a check valve in the bleed line, operable to prevent flow through the bleed line when the pressure across the check valve falls below a predetermined level. This causes the potentiometer to become inoperable once the fuel flow has been reduced somewhat, thereby limiting the authority of the potentiometer.

BRIEF DESCRIPTION OF THE DRAWINGS

Preferred embodiments of the present invention will now be described by way of example, with reference to the accompanying drawings, wherein.

DESCRIPTION OF THE PREFERRED EMBODIMENTS

Figure 1:
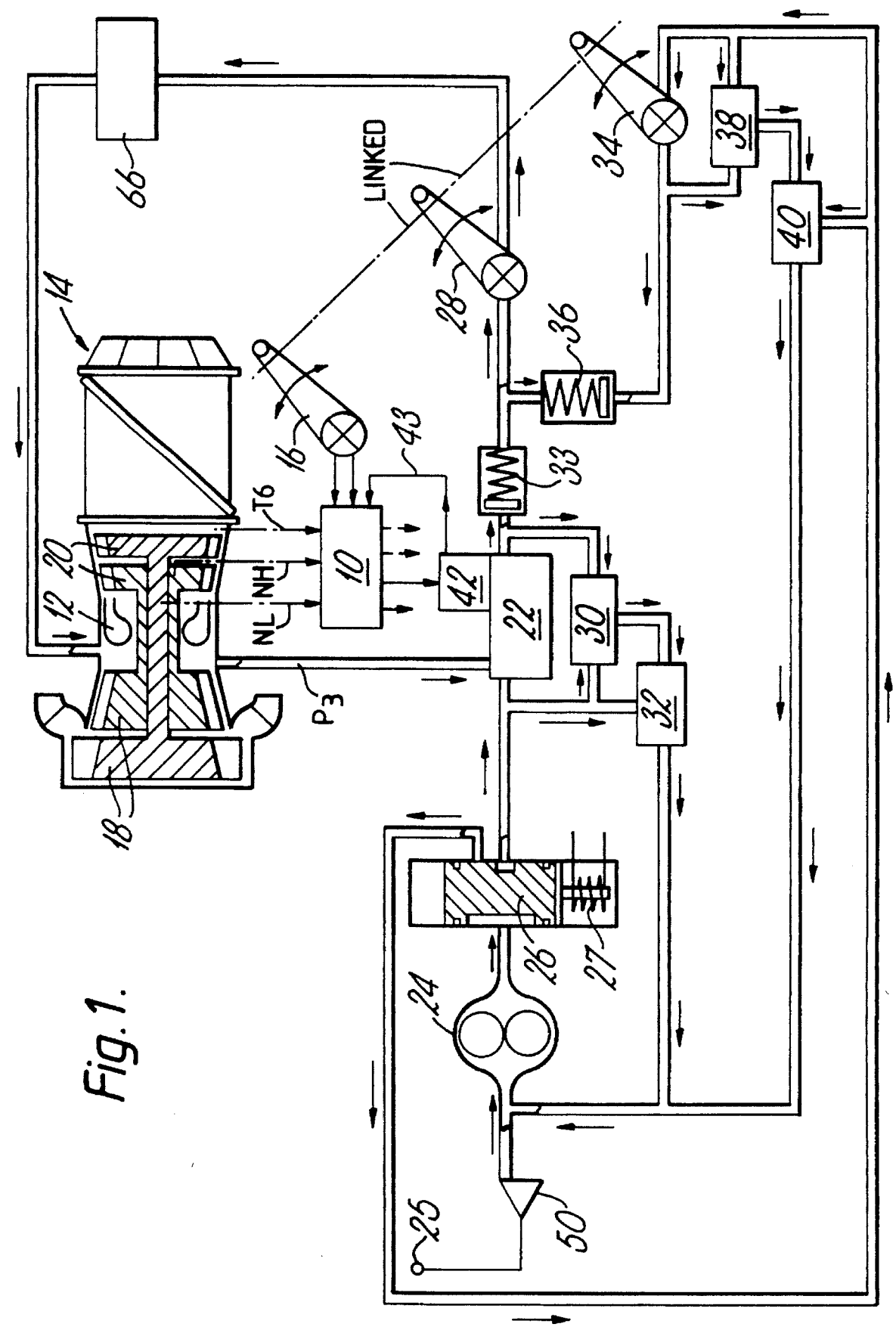
FIG. 1 illustrates schematically a prior known fuel control system for a gas turbine aero engine which does not incorporate the present invention.

Referring to FIG. 1 there is shown a known fuel control system which employs a digital electronic control unit 10 (DECU). The DECU 10 controls the rate of fuel flow to the combustion equipment 12 of the engine 14 in response to movement of a throttle lever 16 by the pilot of the aircraft.

The DECU 10 monitors the position of the throttle lever 16 relative to a datum and also monitors various parameters of the engine and its environs.

Examples of such parameters are pressures and temperatures within the engine and ambient pressures and temperatures, speeds of rotation of one or more of the compressors 18 or turbines 20 of the engine, and altitude and forward speed of the aircraft. The DECU computes and compares the monitored parameters with predetermined schedules of parameters and relates this information to the position of the throttle lever 16 to operate a main metering valve 22 via a stepping motor 42, as described below.

Fuel is supplied from a source 25 (pumped from the aircraft fuel tanks) to a first stage pump 50 and then to a main supply gear pump 24. This gear pump 24 supplies pressurized fuel to a selector valve 26 (sometimes called a changeover valve) activated by a solenoid valve 27 which enables the pilot to override the control system and operate it manually. The pressurized fuel is supplied to the inlet of the main metering valve 22 and flows via a non-return valve 33, a shut-off valve (sometimes called a shut-off-cock) 28 which is ganged to move with the pilot's throttle lever 16, and a minimum pressure valve 66, to the main jets of the combustion equipment 12. The shut off valve 28 is designed so that, although it is moved with the lever 16, it is fully open for all movements of the lever 16 between the lowest idle speed of the engine and the maximum speed of the engine. The shut off valve 28 is only moved to the closed position (where it stops the fuel flow) to shut down the engine for "normal" shut down or emergency shut down.

The fuel flow rate through the main metering valve 22 is controlled by measuring the pressure drop across the inlet and outlet of the valve 22 by means of a pressure drop regulator 30 and controlling a spill valve 32 which returns excess fuel back to a location upstream of the pump 24. In this way the pressure drop is regulated to predetermined values. To provide a facility for adjusting the fuel flow rapidly if the engine surges, the H.P. compressor delivery pressure $P_3$ is also used to adjust the metering valve 22 directly and thereby cut-off or severely reduce the flow of fuel to the combustion equipment in the event of the engine surging.

When the selector valve 26 is moved to the manual position, the main metering valve 22 is by-passed and the pressurized fuel is directed from the pump 24 to a manual fuel control (MFC) throttle valve 34 which is ganged to move with the throttle lever 16 and the shut-off valve 28. The flow from the MFC throttle valve 34 flows via a non return valve 36 to the main jets of the combustion equipment 12 of the engine. The flow rate through the MFC throttle valve is controlled by a pressure drop regulator 38 and a spill valve 40 which returns excess fuel to the pump 24 inlet.

During normal use, the main metering valve 22 controls the flow of fuel to the combustion equipment 12 and the MFC throttle valve 34, the pressure drop regulator 38 and the spill valve 40 are redundant.

It will be seen that the main metering valve 22 is controlled by a feedback loop 43 which incorporates the DECU 10 and the stepping motor 42 which opens and closes the valve 22 to vary the flow rate. The response time of the valve 22 is dependent upon the time taken for the DECU 10 to sample and compute the various parameters, and particularly upon the ramp time of the stepping motor. These restraints may seriously limit performance of the system during vertical landings.

Figure 2:
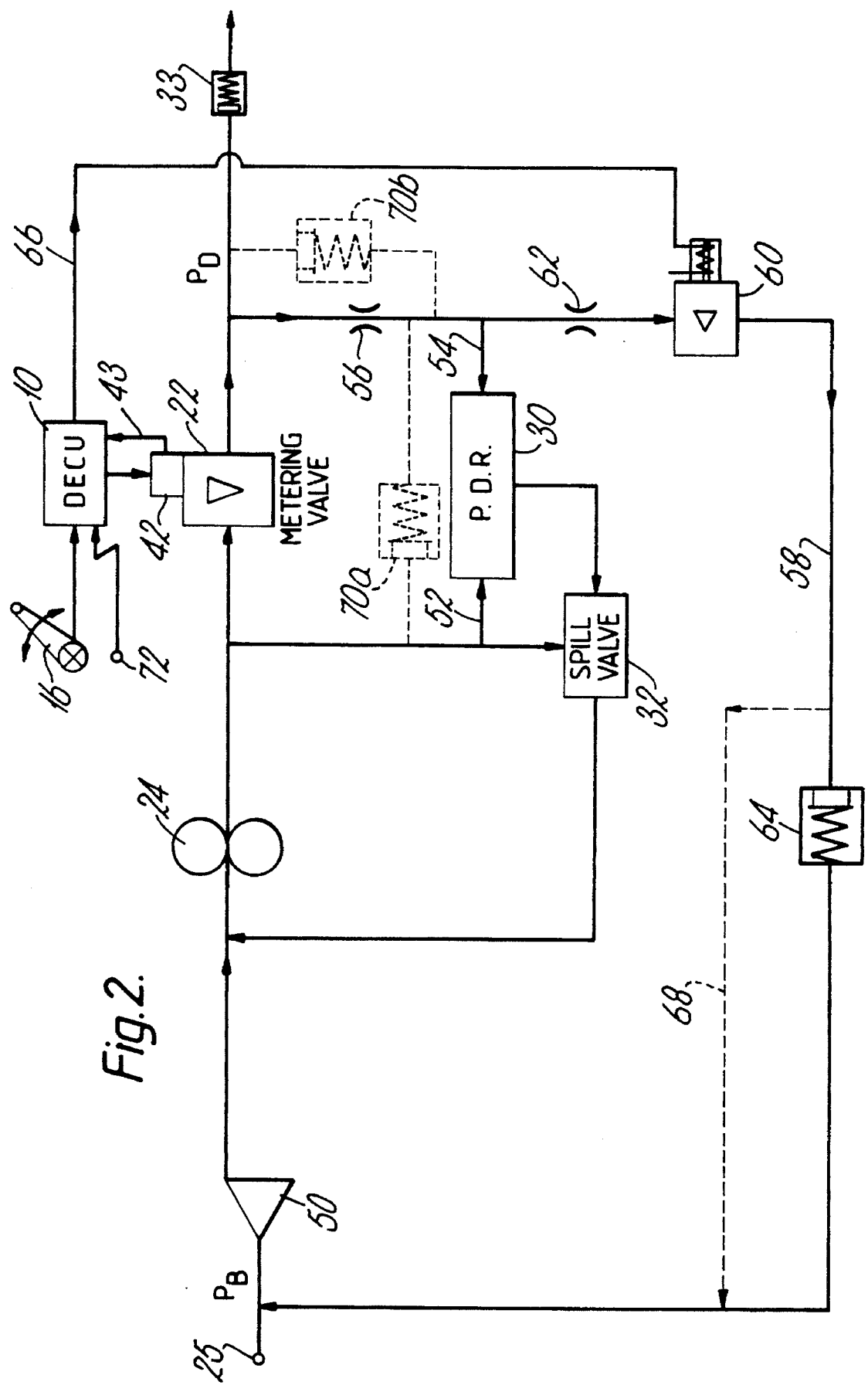
FIG. 2 illustrates schematically a part of the system according to FIG. 1 modified to incorporate the embodiments of the present invention.

FIG. 2 illustrates the preferred embodiment the present invention fitted in the fuel control system of FIG. 1. Only those parts of the fuel control system necessary to understand the present invention have been shown in FIG. 2, but the reader will understand that the complete practical embodiment nevertheless includes such features as (for example) the change-over valve 26 and the various manual fuel control components.

It will be seen that the pressure drop regulator 30 has its input 52 connected to the inlet side of the metering valve 22 as described previously, but the input 54 of the pressure drop regulator, instead of being connected directly to the outlet of the metering valve 22, is now connected to that outlet via a flow restricting orifice 56. A bleed line 58 is also connected to the input 54, via a normally closed solenoid valve 60 and a second flow restricting orifice 62. When the solenoid valve 60 is closed, obviously the bleed line 58 has no effect, and since there will be no flow through the orifice 56, there is no pressure drop across it and therefore the input 54 sees the outlet pressure from the metering valve. The pressure drop regulator 30 therefore works in exactly the same manner as described in relation to the known system of FIG. 1. This is an important consideration, since it is most desirable that any modification to an existing system should have as little effect as possible on the normal operation of the system.

The bleed line 58 bleeds fuel to a source of low pressure $P_B$ upstream of the first stage pump 50 when the solenoid valve 60 is open. In one embodiment of the invention, this may be a direct connection to the source of low pressure, as shown by broken line 68. In another embodiment, the connection is via a check valve 64, the function of which will be described in more detail below.

The solenoid valve 60 is controlled so as to open when the pilot of the aircraft slams the throttles shut when he detects touchdown following a vertical or rolling landing. One way of achieving this would be to include a manual trigger on the control lever 16, but this is not preferred. It is preferable to open the solenoid valve 60 in response to a fast negative rate of change of the angle of the control lever 16.

Whilst this may be achieved by electronic hardware arranged to detect such a fast negative rate of change in excess of a predetermined value, our preference is simply to include appropriate programming in the software of the DECU 10. Accordingly, when the sampling of the angle of the control lever 16 which is carried out continuously by the DECU 10 shows that the predetermined negative rate of change of angle has been exceeded, corresponding to the pilot slamming shut the throttle, the DECU 10 provides an output on a control line 66, which opens the solenoid valve.

The DECU software may also contain safeguards to prevent inadvertent operation of the solenoid valve in other circumstances, e.g., normal flight. One such safeguard which has been found advantageous involves the use of a switch 72 on the undercarriage of the aircraft. This provides an input to the DECU 10 when weight is placed on the undercarriage wheels during landing. The DECU software opens a time "window" of, say, 2 seconds duration on receipt of this input, and only outputs a signal on the line 66 if the predetermined negative rate of change of control lever angle is exceeded during that window. Rates of change of angle in excess of the predetermined limit have no effect at other times.

Once the solenoid valve is open, fuel bleeds from the output of the metering valve 22, through the orifices 56 and 62 and along the bleed line 58 to the source of low pressure. The orifices 56 and 62 now act as a pressure potentiometer and there is a pressure drop across the orifice 56, depending on the relative sizes of the two orifices. The effect of this pressure drop across the orifice 56 is additive to the pressure drop across the metering valve 22, as sensed by the inputs 52, 54 of the pressure drop regulator. Accordingly, the pressure drop regulator sees an effective increase in pressure drop, and acts on the spill valve 32 to spill more fuel back upstream of the gearpump 24. The result is a sudden decrease in the fuel flowing through the valve 22 to the combustion equipment of the engine. Because of the ramp time of the stepper motor 42 and valve 22 before they can respond via the DECU 10 to the sudden change in angle of the control lever 16, the reduction in fuel output produced by the action described above is much faster than could be achieved by simply relying on the action of DECU 10, stepper motor 42 and metering valve 22. The control system described is therefore much more effective in controlling bounce of the aircraft on landing.

It will be appreciated that the relative sizes of the orifices 56 and 62 have the effect (when the solenoid valve 60 is open) of resetting the calibration of the pressure drop regulator 30. However, we have experimented with different sizes for the orifice 62 (relative to the orifice 56) and have found that changes in the size of this orifice have little effect upon the actual rate of reduction of fuel output; the effect is simply on the total reduction which the reset calibration of the regulator can achieve, and consequently on the authority of the regulator on the fuel output relative to the authority of the normal action of the DECU 10 on the metering valve 22. Indeed, we have achieved satisfactory rates of reduction of fuel output with no separate flow restricting orifice 62 at all, simply relying on the flow restriction provided by the valve 60 itself, but we prefer not to use such an arrangement since the reset calibration of the regulator 30 would then hold too much authority over the fuel output.

It will be appreciated that the desirable characteristics of a fuel control system such as the present one are that it should give a sudden decrease in fuel flow when the pilot slams shut the control lever 16, in order to control the possibility of the aircraft bouncing on landing, but that after such an initial sudden decrease, thereafter the reduction in the fuel should be at a controlled rate, giving deceleration of the engine to its idle speed under the normal control of the DECU 10. A possible problem arises in this, as follows.

If the bleed line 58 connects the solenoid valve 60 directly to the source of low pressure $P_B$ and if the system output pressure is $P_D$, then at high fuel flow rates the pressure drop $P_D-P_B$ might typically be, for example, 500 psi, falling to, for example, 250 psi at idle speed. In a typical case, the regulator 30 is set to control the pressure drop across the metering valve 22 in normal operation to 60 psi. If it is desired to halve the fuel flow when the solenoid valve 60 is opened (with the remaining reduction in fuel flow down to idle speed being handled by the normal action of the DECU 10 on the metering valve 22), then it can be calculated that the potentiometer action of the orifices 56 and 62 must be such as to create a pressure loss of 45 psi across the orifice 56 when the solenoid valve is opened. Such an arrangement creates a problem, however, as follows. If the potentiometer is set so there is a pressure drop of 45 psi across the orifice 56 when $P_D-P_B=500$ psi, then at the idle speed value of $P_D-P_B$, namely 250 psi, there would still be a pressure drop of 22½ psi across the orifice 56. There would be a correspondingly higher drop across the orifice 56 at higher engine speeds.

It follows that the effect of the potentiometer arrangement on resetting the calibration of the regulator 30 has the undesirable effect of reducing the fuel output not only at high engine speeds, as desired, but also at low engine speeds, and even reduces the idle speed of the engine. In other words, full authority is not returned to the DECU 10 and metering valve 22 once the reset calibration of the regulator 30 has done its job of producing a sudden decrease in fuel flow.

If this effect is felt to be a significant problem, one possible solution is to program the DECU 10 to cancel the output on line 66 once the desired sudden fuel reduction has been achieved, and the feedback line 43 shows that the ramp time of the stepping motor 42 and metering valve 22 is no longer preventing the valve 22 from following the motion of the control lever 16. This closes the solenoid valve 60 and returns the regulator 30 to its original calibration.

Another solution we have found satisfactory in practice is simply to program the DECU 10 to cancel the output 66 and close the valve 60 at a predetermined time (e.g., a half second) after the predetermined limit of rate of change of control lever angle ceases to be exceeded.

However, such solutions may have the further undesirable effect of giving a sudden upward change in the fuel flow. Unless this can take place while the engine is still winding down to its normal idle speed under its own inertia, this may prevent a smooth deceleration of the engine under the control of the DECU 10 and metering valve 22.

This problem, if present, can be avoided by the inclusion of the check valve 64 in the bleed line 58. Given the typical pressures mentioned above, the check valve 64 may, for example, be set to a pressure threshold of 200 psi. Thus, when the solenoid valve 60 is first opened, there will be a pressure well in excess of 200 psi across the check valve 64, which will open. As the fuel output of the system decreases, the check valve 64 will gradually close, gradually reducing the flow through the orifices 56,62 until such time as the check valve 64 is completely closed. The regulator calibration is gradually returned to normal. This achieves a gradual transfer of authority of control over the fuel output of the system from the potentiometer arrangement to the normal action of the DECU 10 on the metering valve 22. Thus, the advantage of the use of the check valve 64 is that it permits the potentiometer arrangement to give the desired rapid initial reduction of the fuel flow to prevent bounce of the aircraft, while the final deceleration of the engine to idle speed is under the normal control of the DECU, irrespective of the energization of the solenoid valve 60. A further advantage is that the solenoid valve 60 can be reclosed (by cancelling the DECU output on line 66) at a non-critical time without fuel flow disturbance.

The inclusion of the check valve 64 does have a slight detrimental effect on the rate of reduction in fuel flow which can be achieved by the potentiometer arrangement. Accordingly, the decisions as to whether to include the check valve 64, and if included as to the threshold pressure to which it should be set, are a question of trading off the rate of reduction of fuel flow against the relative authority of the potentiometer arrangement and normal DECU operation at low speeds, and the desirability that the DECU should have full authority at idle speed. With the typical pressure values discussed above, the value of 200 psi for the threshold of the check valve has been found to be a good compromise. It will be appreciated that the pressure value of the low pressure source $P_B$ will also affect this decision, and for example it may be desired to return the bleed line 58 to a different source of low pressure, such as to the inlet of the gearpump 24, or (if a small, fixed resetting of the regulator calibration is desired) to downstream of the non-return valve 33, since there will be a small pressure drop across that valve.

It will be appreciated that since the orifice 62, the solenoid valve 60 and the check valve 64 are in series in the bleed line 58, it makes no difference as to the order in which they are provided.

In the system described above, opening of the solenoid valve 60 causes a very sudden change in pressure at the input 54 to the pressure drop regulator 30. This sudden change is of course what is desired in order to produce a sudden reduction in fuel flow. However, with the typical pressure values discussed above, after this sudden change there will be a very much greater pressure drop across the inputs 52,54 of the regulator than in normal operation of the system. If the regulator is of the type employing a bellows, the initial transient when the solenoid valve 60 opens may approach the safe stressing limit of the bellows. To limit this very large pressure drop to a more reasonable level and thus safeguard the bellows, while still opening the regulator 30 fully without altering the initial rate of change of pressure seen at the input 54, it is possible to fit a pressure relief valve. This may either be across the inputs 52,54, as shown at 70a, or across the orifice 56, as shown at 70b.

While the invention has been described above in relation to prevention of bounce on landing a vertical take-off aircraft, it will be appreciated that the same system can be used whenever a sudden reduction in fuel flow is required in any gas turbine engine. For example, the solenoid valve 60 may be driven by a surge detector on the engine and be operated to give a temporary reduction in fueling when a surge occurs, so as to control the surge, prevent any harmful effects and allow a fast return to normal engine operation.

We claim:

1. A fuel control system for regulating the flow of fuel to combustion equipment of a gas turbine engine in accordance with the setting of a control member, said fuel control system comprising:

fuel flow metering means having an inlet connected to a source of pressurized fuel and an outlet connected to the combustion equipment;

differential pressure sensing means having first and second inputs connected respectively to the inlet and the outlet of the flow metering means, and an output arranged to operate first valve means which is connected to divert fuel from the inlet of the fuel flow metering means when operated, the differential pressure sensing means being arranged to operate the first valve means when the differential pressure between the inlet and outlet of the flow metering means exceeds a predetermined value; and further valve means connected with the second input of the differential pressure sensing means and operable in response to a sudden closure of the control member to increase the effective pressure drop sensed by the differential pressure sensing means, whereby the first valve means acts to cause a reduction in fuel flow through the flow metering means.

2. A fuel control system according to claim 1, further comprising means responsive to a rate of movement of the control member to operate the further valve means when the rate of movement exceeds a value corresponding to a predetermined rate of reduction of fuel flow.

3. A fuel control system according to claim 1, wherein said second input of the differential pressure sensing means is connected with the outlet of the flow metering means via a flow restrictor, and the further valve means acts to bleed fuel away from said input along a bleed line to a source of lower pressure, thereby causing a pressure drop across the flow restrictor which is sensed by the pressure sensing means.

4. A fuel control system according to claim 3, further comprising a second flow restrictor connected in the bleed line, whereby the two said flow restrictors cooperate to act as a pressure potentiometer on the second input of the differential pressure sensing means.

5. A fuel control system according to claim 4, further comprising a check valve connected in the bleed line to prevent flow through the bleed line when the pressure across the check valve falls below a predetermined level.

6. A fuel control system according to claim 1, wherein the gas turbine engine is installed in an aircraft and wherein the further valve means is connected for operation to an output of an electronic engine control means having two inputs, a first of the two engine control means inputs being connected with the control member and a second of the two engine control means inputs being connected to means responsive to a weight load on an undercarriage of the aircraft, said engine control means operating the further valve means upon actuation of both of said two engine control means inputs.

7. A fuel control system according to claim 6, wherein said engine control means is arranged to operate the further valve means only when the first of the two engine control means inputs connected with the control member is actuated within a limited period of actuation of the second of the engine control means inputs connected with the means responsive to the weight load on the undercarriage.

* * * * *